United States Patent
Shirasaka et al.

(10) Patent No.: US 8,868,275 B2
(45) Date of Patent: Oct. 21, 2014

(54) OUTWARD POWER SUPPLY CONTROL APPARATUS FOR FUEL CELL VEHICLE

(71) Applicant: Honda Motor Co., Ltd., Tokyo (JP)

(72) Inventors: Takuya Shirasaka, Sakura (JP); Morio Kayano, Utsunomiya (JP); Daishi Igarashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/840,065

(22) Filed: Mar. 15, 2013

(65) Prior Publication Data

US 2013/0245871 A1  Sep. 19, 2013

(30) Foreign Application Priority Data

Mar. 19, 2012 (JP) .................. 2012-062831

(51) Int. Cl.
  *B60L 11/18* (2006.01)
  *B60L 1/00* (2006.01)
  *B60L 11/12* (2006.01)

(52) U.S. Cl.
  CPC .......... *B60L 11/1881* (2013.01); *Y02T 10/7088* (2013.01); *Y02T 10/7077* (2013.01); *Y02E 60/721* (2013.01); *Y02T 90/163* (2013.01); *B60L 11/1842* (2013.01); *Y02T 10/6217* (2013.01); *B60L 1/006* (2013.01); *Y04S 10/126* (2013.01); *Y02T 10/7005* (2013.01); *B60L 11/126* (2013.01); *Y02T 90/34* (2013.01); *Y02T 90/14* (2013.01); *Y02T 90/128* (2013.01)
  USPC ......................................... 701/22; 180/65.31

(58) Field of Classification Search
  CPC .......................... B60W 20/1084; B60W 20/00
  USPC .......... 701/22; 180/65.1, 65.31; 903/908, 944
  See application file for complete search history.

(56) References Cited

U.S. PATENT DOCUMENTS

| 7,377,345 B2 | 5/2008 | Hasuka et al. | |
| 2004/0013920 A1* | 1/2004 | Hasuka et al. | 429/23 |

(Continued)

FOREIGN PATENT DOCUMENTS

| JP | 2001-266918 A | 9/2001 |
| JP | 2003-023706 A | 1/2003 |

(Continued)

OTHER PUBLICATIONS

German Search Report, German Application No. 10 2013 204631.6 dated Aug. 2, 2013.

(Continued)

*Primary Examiner* — Mary Cheung
*Assistant Examiner* — Rodney Butler
(74) *Attorney, Agent, or Firm* — Westerman, Hattori, Daniels & Adrian, LLP

(57) ABSTRACT

An ECU of a control apparatus further alleviates a fluctuation in a power generation amount of a fuel cell stack with respect to the power required by an inverter apparatus, when a power supply circuit configured by each of contactors and a power supply inlet 11a supplies the power to the inverter apparatus compared with when a vehicle is driving. The ECU, when the power supply circuit supplies power to the inverter apparatus, stops the power generation of the fuel cell stack in a case where a remaining capacity in a battery is greater than or equal to a predetermined remaining capacity, and inhibits the fuel cell stack from stopping the power generation in a case where the power supplied to the inverter apparatus by the power supply circuit is greater than or equal to a predetermined power supply amount.

2 Claims, 7 Drawing Sheets

(56) References Cited

U.S. PATENT DOCUMENTS

2009/0269622 A1* 10/2009 Aso .................................. 429/9
2011/0003223 A1* 1/2011 Saeki ............................ 429/432

FOREIGN PATENT DOCUMENTS

| JP | 2005-071797 A | 3/2005 |
| JP | 2006-121844 A | 5/2006 |
| JP | 2011-066973 A | 3/2011 |

OTHER PUBLICATIONS

Japanese Office Action issued Nov. 19, 2013, in counterpart Japanese Patent Application No. 2012-062831 (8 pages, including English translation).

Japanese Notice of Allowance dated Jun. 3, 2014, issued in corresponding Japanese Patent Application No. 2012-062831 with English translation (6 pages).

* cited by examiner

OUTWARD POWER SUPPLY CONTROL APPARATUS FOR FUEL CELL VEHICLE

CROSS-REFERENCE TO RELATED APPLICATION

Priority is claimed on Japanese Patent Application No. 2012-062831, filed on Mar. 19, 2012, the content of which is incorporated herein by reference.

BACKGROUND

1. Field of the Invention

The present invention relates to an outward power supply control apparatus for a fuel cell vehicle.

2. Description of Related Art

In the related art, for example, an electric vehicle is known, that includes a fuel cell and a secondary battery which are capable of supplying power to an external load, and that increases an amount of reactive gas supplied to the fuel cell in a case where the external load increases, and that, in a period of time until an output of the fuel cell increases due to the increased reactive gas, increases the output of the secondary battery so as to compensate a response time lag of the fuel cell (for example, refer to Japanese Unexamined Patent Application, First Publication No. 2003-23706).

SUMMARY

According to the above-described electric vehicle in the related art, since the flow amount of the reactive gas to be supplied to the fuel cell is changed due to the change of an external load, for example, the number of rotations in an air pump which supplies the air as the reactive gas frequently fluctuates, and there is concern regarding increased noise due to such fluctuation.

An aspect according to the present invention is made in view of the above-described circumstances, and an object thereof is to provide an outward power supply control apparatus for a fuel cell vehicle that is capable of suppressing the generation of noise and preventing a distraction to a driver due to the noise generated when driving a vehicle.

An aspect according to the present invention includes the following means for achieving the object related to solving the problems.

(1) An outward power supply control apparatus for a fuel cell vehicle according to a first aspect of the present invention includes, a fuel cell stack, an air pump which supplies an air to the fuel cell stack, an air pump motor which drives the air pump, an electrical storage apparatus, a drive motor driven by power from the fuel cell stack and the electrical storage apparatus, a power supply circuit which is capable of supplying power from the fuel cell stack and the electrical storage apparatus to an equipment outside the vehicle and a control device. The control device includes a power generation fluctuation limiting device which further alleviates a fluctuation in a power generation amount of the fuel cell stack with respect to the power required by the equipment, when the power supply circuit supplies the power to the equipment compared with when the vehicle is driving.

(2) In the aspect of (1), in the outward power supply control apparatus for a fuel cell vehicle according to a second aspect of the present invention, the control device may perform an idling stop process which stops the power generation of the fuel cell stack, when the power supply circuit supplies the power to the equipment, in a case where a remaining capacity in the electrical storage apparatus is greater than or equal to a predetermined remaining capacity, and an idling continuing process which continues the power generation in a case where the power supplied to the equipment by the power supply circuit is greater than or equal to a predetermined power supply amount.

According to the aspect of (1), in a case where the power is supplied to the external equipment by the power supply circuit configured by the contactors or the power supply inlet and the like which are installed in the fuel cell vehicle, it is possible to suppress frequent fluctuations in the number of rotations in the air pump in response to the power required by the equipment.

As a result, for example, the number of rotations in the air pump fluctuates so as to comply with the driving force required by the fuel cell vehicle based on a driver's accelerator pedaling operation or the like, and hence it is possible to prevent the driver from being distracted due to the noise generated according to the number of rotations in the air pump when driving the fuel cell vehicle.

According to the aspect of (2), it is possible to decrease fuel consumption by the idling stop process. In addition to this, even though the remaining capacity of the electrical storage apparatus is greater than or equal to the predetermined capacity, in a case where the power supplying to the external equipment is greater than or equal to predetermined power, it is possible to prevent the air pump from frequently repeating the stopping and driving by inhibiting the idling stop process from stopping the power generation (the idling continuing process).

DESCRIPTION OF THE EMBODIMENT

Hereinafter, an outward power supply control apparatus for a fuel cell vehicle according to an embodiment of the present invention will be described in reference to the accompanying drawings.

Figure 1:
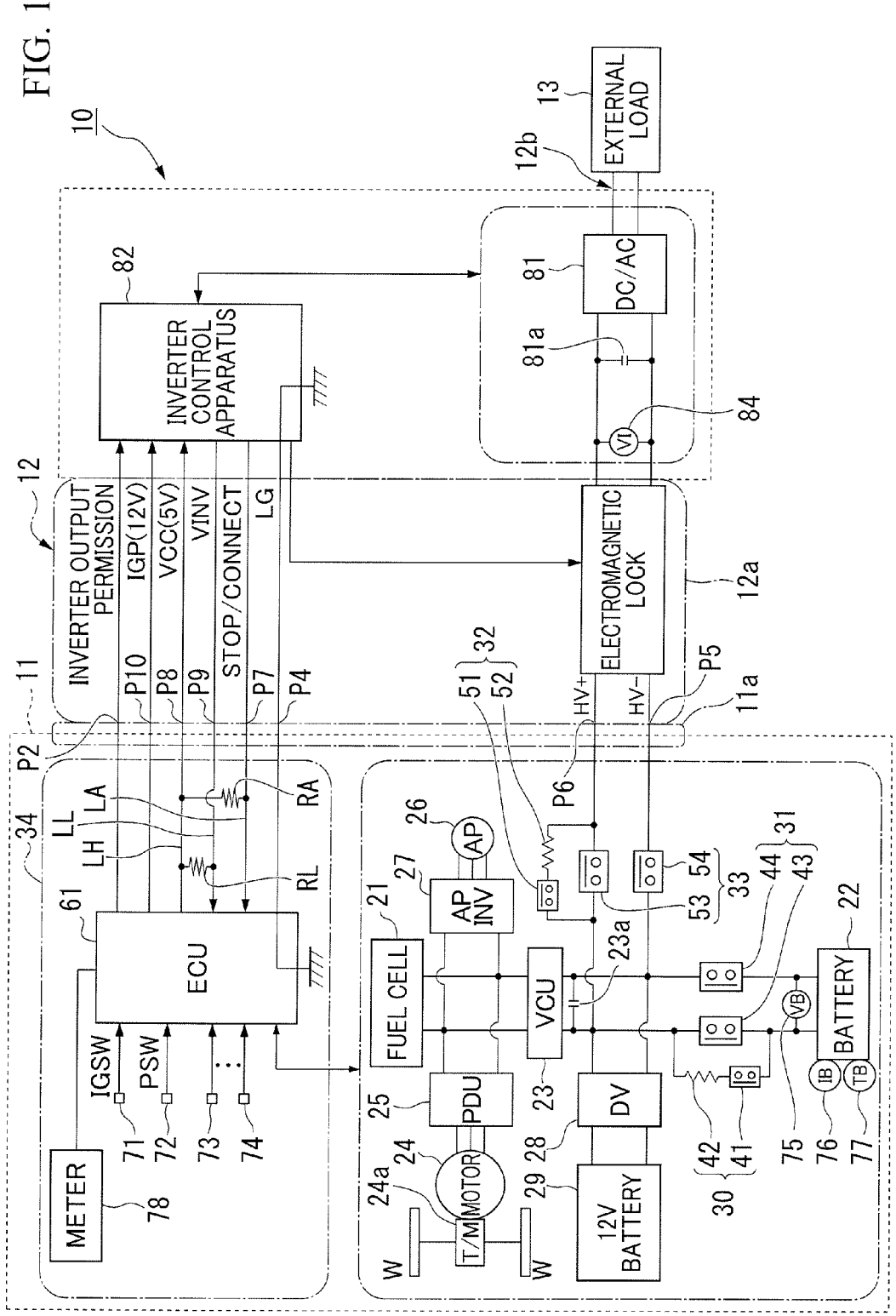
FIG. 1 is a configuration diagram illustrating a power supply system according to an embodiment of the present invention.

The outward power supply control apparatus for the fuel cell vehicle according to the present embodiment, for example, as illustrated in FIG. 1, is installed in a fuel cell vehicle 11 which configures a power supply system 10. The power supply system 10 is configured to include, for example, the fuel cell vehicle 11 and an inverter apparatus (an equipment) 12 which is provided separate from the fuel cell vehicle 11, and supplies power with respect to an external load 13 such as external AC equipment or the like.

Then, for example, the outward power supply control apparatus for the fuel cell vehicle according to the present embodiment is a control apparatus (a control device) 34 which is installed in the fuel cell vehicle 11.

The fuel cell vehicle 11, for example, in a trunk room or the like on the rear part of the vehicle, includes a power supply inlet (a power supply circuit) 11a which is connected to a power source of the fuel cell vehicle 11, and an inverter apparatus 12 can be installed in the trunk room or the like.

The inverter apparatus 12, for example, includes a power supply connector 12a which is detachably attached to and fitted to the power supply inlet 11a provided in the fuel cell vehicle 11.

Then, the power supply connector 12a, as described below, includes multiple connector pins that are electrically connectable to multiple terminals provided in the power supply inlet 11a.

The power supply inlet 11a of the fuel cell vehicle 11 and the power supply connector 12a of the inverter apparatus 12 are fitted together, and as a result of such a fitting, the fuel cell vehicle 11 and the inverter apparatus 12 are electrically connected in such a manner that the multiple connector pins of the power supply connector 12a is connected to the multiple terminals of the power supply inlet 11a.

In addition, the inverter apparatus 12 includes, for example, a power output unit 12b to which the external load 13 can be electrically connected and can convert DC power of the fuel cell vehicle 11, which is input from the power supply connector 12a, into AC power. Then, the inverter apparatus 12 can supply the converted AC power to the external load 13 from the power output unit 12b.

The fuel cell vehicle 11 is configured to include, for example, a fuel cell stack 21, a battery (an electrical storage apparatus) 22, a voltage control unit (VCU) 23, a drive motor 24, a power drive unit (PDU) 25, an air pump 26, an air pump inverter (APINV) 27, a downverter (DV) 28, a 12V battery 29, a battery pre-charge unit 30 and a battery contactor unit 31, an outward power supply pre-charge unit 32 and an outward power supply contactor unit 33, and a control apparatus 34.

The fuel cell stack 21 is configured, for example, such that a solid polymer electrolyte membrane made from a cation exchange membrane, an electrolyte electrode structure formed by being interposed between a fuel electrode (an anode) formed from an anode catalyst and gas diffusion layer, and an oxygen electrode (a cathode) formed from a cathode catalyst and gas diffusion layer, and additionally a fuel cell formed by being interposed between a pair of separators are stacked to form multiple combination layers. Then, the stacked body of the fuel cell is sandwiched by a pair of end plates from both ends in the stacking direction.

Air which is oxidant gas (reactive gas) containing oxygen can be supplied from the air pump 26 to the cathode of the fuel cell stack 21, and fuel gas (reactive gas) containing hydrogen can be supplied from a high pressure hydrogen tank or the like (not illustrated) to the anode.

Then, when the reactive gas is supplied, the hydrogen which is ionized due to a catalytic reaction on the anode catalyst of the anode moves to the cathode via the moderately humidified solid polymer electrolyte membrane, and an electron generated by such a movement is drawn out to an external circuit, to generate DC power. During the process, at the cathode, water is produced by a reaction of the hydrogen ion, electron and oxygen.

The battery 22 is, for example, a high-voltage lithium ion type secondary battery and is connected to the fuel cell stack 21 via the voltage control unit 23.

The voltage control unit 23 includes, for example, a DC-DC converter or the like and performs a voltage control with respect to an exchange of electric power between the fuel cell stack 21 and the battery 22.

In addition, the voltage control unit 23 includes, for example, a smoothing capacitor 23a at the battery 22 side.

The drive motor 24 is, for example, a DC brushless motor with a three-phase of U-phase, V-phase and W-phase and can perform a power driving operation or a power generation operation in response to a control by the power drive unit 25.

For example, the drive motor 24 performs the power driving operation by conducting electricity of an AC phase-current to each phase-coil and drives a driving wheel W via a transmission (T/M) 24a. Further, when the fuel cell vehicle 11 decreases the speed or the like, the drive motor 24 performs the power generation operation (regenerating operation) by a transferred driving power from the driving wheel side and outputs the generated power (regenerated power).

The power drive unit 25 is, for example, configured to include an inverter with a pulse width modulation (PWM) in which a bridge circuit formed by a bridge connection using multiple switching elements such as a transistor and a smoothing capacitor are provided.

The inverter, for example, when the drive motor 24 performs the power driving operation, switches each switching element on (conductive) and/or off (cut-off) which forms a pair for each phase, based on a PWM signal output from the control apparatus 34. As a result, the inverter converts DC power supplied from the battery 22 via the voltage control unit 23 or DC power supplied from the fuel cell stack 21, into a 3-phase AC power and conducts each AC phase-current by sequentially commutating the phase-current conduction to each phase-coil in the drive motor 24.

On the other hand, for example, when the drive motor 24 performs the power generation operation, the inverter switches each switching element on (conductive) and/or off (cut-off) in response to a gate signal synchronized based on a rotation angle of a rotor in the drive motor 24 and converts generated AC power output from the drive motor 24 into DC power.

The air pump 26, for example, is an electric compressor that includes an air pump motor (not illustrated) which is rotationally driven by AC power output from the air pump inverter 27, compresses the air taken from the outside, and supplies the compressed air to the cathode of the fuel cell stack 21 as reactive gas.

The air pump inverter 27, for example, is a PWM inverter or the like using a pulse width modulation (PWM), causes the air pump motor of the air pump 26 to be rotationally driven by DC power supplied from the battery 22 via the voltage control unit 23 or DC power supplied from the fuel cell stack 21, based on the control signal output from the control apparatus 34, and controls the number of rotations of the air pump motor.

The downverter 28, for example, includes a DC-DC converter or the like, lowers a high voltage between the terminals of the battery 22 or a high voltage applied from the fuel cell stack 21 via the voltage control unit 23, to a predetermined low voltage (12V), and charges the 12V battery 29 using the lowered power of predetermined voltage.

The 12V battery 29, for example, outputs a predetermined low voltage power for driving the electric load configured by the control apparatus 34 and various auxiliary equipments.

The battery pre-charge unit 30 and the battery contactor unit 31, for example, are provided between the battery 22, and the voltage control unit 23 and the downverter 28.

The battery pre-charge unit 30, for example, is configured by a pre-charge contactor 41 and a pre-charge resistor 42 which are serially connected to each other.

The battery contactor unit 31, for example, is configured by a positive electrode side battery contactor 43 which is connected to a positive terminal of the battery 22 in a positive electrode side high voltage line (HV+) of the fuel cell vehicle 11, and a negative electrode side battery contactor 44 which is connected to a negative terminal of the battery 22 in a negative electrode side high voltage line (HV−) of the fuel cell vehicle 11.

Then, the battery pre-charge unit 30 is connected to both ends of the positive electrode side battery contactor 43 (that is, parallel to the positive electrode side battery contactor 43).

The outward power supply pre-charge unit 32 and the outward power supply contactor unit 33, for example, are provided between the battery pre-charge unit 30 and the battery contactor unit 31, and the power supply inlet 11a.

The outward power supply pre-charge unit 32, for example, is configured by a pre-charge contactor (a power supply circuit) 51 and a pre-charge resistor 52 which are serially connected each other.

The outward power supply contactor unit 33, for example, is configured by a positive electrode side outward power supply contactor (a power supply circuit) 53 which is connected to the positive electrode side battery contactor 43 in the positive electrode side high voltage line (HV+) of the fuel cell vehicle 11, and a negative electrode side outward power supply contactor (a power supply circuit) 54 which is connected to the negative electrode side battery contactor 44 in the negative electrode side high voltage line (HV−) of the fuel cell vehicle 11.

Then, the outward pre-charge unit 32 is connected to both ends of the positive electrode side outward power supply contactor 53 (that is, parallel to the positive electrode side outward power supply contactor 53).

Each of the contactors 41, 43, 44, 51, 53 and 54 can switch each conductive path on and off, based on the control signal output from the control apparatus 34.

The control apparatus 34, for example, includes an ECU (Electronic Control Unit) 61 which is configured by an electronic circuit such as a CPU (Central Processing Unit) or the like.

The ECU (a power generation fluctuation limiting device) 61, for example, controls the power driving operation and the power generation operation of the drive motor 24 by controlling a power conversion operation of the power drive unit 25.

For example, the ECU 61 calculates a target torque of the drive motor 24, based on signals output from various sensors and switches or the like, and performs a feedback control with respect to a conductive current into the drive motor 24 by matching an actual output torque from the drive motor 24 with the target torque.

The ECU 61, for example, controls a supply of reactive gas to the fuel cell stack 21 and amount of power generation of the fuel cell stack 21 by controlling the power conversion operation of the air pump inverter 27, an opening and closing of various valves provided on a flow channel for the reactive gas, and a voltage control operation of the voltage control unit 23 or the like.

The ECU 61, for example, performs control such as a monitoring and protection of a high voltage electric system including the battery 22 based on the output signals from various sensors and switches and furthers an output signal from an inverter control apparatus 82.

For example, the ECU 61 controls a driving status of the fuel cell vehicle 11, based on various instruction signals from an ignition switch 71 and a power switch 72 or the like, and based on various detection signals from a speed sensor 73, an accelerator pedal opening degree sensor 74 and a brake pedal switch (not illustrated) or the like.

Furthermore, the ignition switch 71 outputs an instruction signal (IGSW) which instructs a start-up or stop of the fuel cell vehicle 11 in response to an operation of a driver.

In addition, the power switch 72 outputs an instruction signal (PSW) which instructs a start-up (for example, a start-up of the air pump 26 or the like) of the fuel cell stack 21 in response to the operation of a driver.

In addition, the speed sensor 73 detects a speed of the fuel cell vehicle 11.

In addition, the accelerator pedal opening degree sensor 74 detects a stroke amount of an accelerator pedal (accelerator opening degree) in response to a driver's accelerator pedaling.

In addition, the brake pedal switch detects the presence or absence of the brake pedal operation of the driver.

In addition, the ECU 61, for example, calculates various quantities of states such as a remaining capacity SOC (State Of Charge) or the like, based on each detected signal from sensors such as a battery voltage sensor 75 which detects a voltage between terminals of the battery 22 (battery voltage) VB, a battery current sensor 76 which detects a current IB, and a battery temperature sensor 77 which detects a temperature TB.

Then, the ECU 61 controls the charging and discharging of the battery 22 by controlling the conduction or cut-off of the battery pre-charge unit 30 and the battery contactor unit 31, based on the calculated various quantities of states.

Furthermore, a meter 78 that is formed of gauges which display various states of the fuel cell vehicle 11, is connected to the ECU 61, along with various sensors, switches and the like.

Furthermore, as described later, the ECU 61 controls the power supply to the inverter apparatus 12 connected to the fuel cell vehicle 11 and the power conversion operation of the inverter apparatus 12, and detects the presence or absence of abnormality of the inverter apparatus 12.

For example, the ECU 61 controls the power supply to the inverter apparatus 12 by controlling the conduction and cut-off of the outward power supply pre-charge unit 32 and the outward power supply contactor unit 33.

The inverter apparatus 12, for example, is configured to include at least one or more inverters 81 and an inverter control apparatus 82.

The inverter 81, for example, is configured to include a bridge circuit formed by a bridge connection using multiple switching elements such as a transistor or the like and a smoothing capacitor, and switches each switching element on (conductive) and/or off (cut-off) based on the switching instruction signal output from the inverter control apparatus 82. As a result, the inverter 81 converts DC power which is supplied from the power source (for example, the fuel cell stack 21 and the battery 22) of the fuel cell vehicle 11 via the power supply connecter 12a fitted to the power supply inlet 11a provided in the fuel cell vehicle 11, into AC power, and the converted AC power can be supplied to the external load 13.

In addition, the inverter 81, for example, is connected to the outward power supply contactor unit 33 via a smoothing capacitor 81a.

The inverter control apparatus 82, for example, is operated by a control power supplied from the ECU 61 of the fuel cell vehicle 11 and controls the power supply to the external load 13 by controlling the power conversion operation of the inverter 81 and the operation of an electromagnetic lock 83 of the power supply connector 12a, based on various instruction signals output from the ECU 61.

In addition, the inverter control apparatus 82, for example, outputs a signal of information relating to the state of the inverter apparatus 12, (for example, a VINV signal of the inverter voltage described later) based on a detected signal from an inverter voltage sensor 84 which detects an input voltage to the inverter 81 (inverter voltage VI).

The inverter control apparatus 82, for example, includes terminals that are connected to connector pins P1 to P10, which are provided in the power supply connector 12a, a terminal connected to an input terminal P11 of an electromagnetic lock 83 which supplies power for driving the electromagnetic lock 83 of the power supply connector 12a, and a terminal connected to an output terminal P12 of a disconnection detection circuit (not illustrated) or the like which is provided in the power supply connector 12a.

In addition, the power supply inlet 11a of the fuel cell vehicle 11 includes terminals that are connected to the connector pins P1 to P10 of the power supply connector 12a, and the ECU 61 of the control apparatus 34 includes terminals that are connected to terminals of the power supply inlet 11a, via an appropriate signal line.

In addition, the connecter pin P2 of the power supply connector 12a, for example, is used in supplying an inverter output permission signal which is output from the ECU 61 of the control apparatus 34 to the inverter control apparatus 82, in other words, an instruction signal which permits power from the inverter apparatus 12 to be output to the external load 13.

In addition, the connector pin P4 of the power supply connector 12a, for example, is used in supplying an LG signal which indicates an electric potential grounded in the ECU 61 of the control apparatus 34 and the inverter control apparatus 82, in other words, an instruction signal which permits or prohibits the power supply from the fuel cell vehicle 11 to the inverter apparatus 12.

In addition, the connector pin P5 of the power supply connector 12a, for example, is connected to the negative electrode side high voltage line (HV−) of the power source (for example, the fuel cell stack 21, the battery 22 and the like) of the fuel cell vehicle 11 and is used in supplying the high voltage power of the negative electrode side from the fuel cell vehicle 11 to the inverter apparatus 12.

In addition, a connecter pin P6 of the power connector 12a, for example, is connected to the positive electrode side high voltage line (HV+) of the power source (for example, the fuel cell stack 21 and the battery 22 and the like) of the fuel cell vehicle 11 and is used in supplying the positive electrode side high voltage power from the fuel cell vehicle 11 to the inverter apparatus 12.

In addition, the connector pin P7 of the power supply connector 12a, for example, is used in supplying a STOP/CONNECT signal (hereafter simply called CONNECT signal) output from the inverter control apparatus 82 to the ECU 61 of the control apparatus 34, in other words, a fitting signal which indicates whether the power supply inlet 11a and the power supply connector 12a are fitted together or not.

In addition, the connector pin P8 of the power supply connector 12a, for example, is used in supplying a VCC signal output from the ECU 61 of the control apparatus 34 to the inverter control apparatus 82, in other words, a signal with a predetermined control voltage (5V) according to a control voltage supplied from the ECU 61 to the inverter control apparatus 82.

In addition, the connector pin P9 of the power supply connector 12a, for example, is used in supplying the VINV signal output from the inverter control apparatus 82 to the ECU 61 of the control apparatus 34, in other words, a signal with a voltage according to an inverter voltage (detected value) VI detected by the inverter voltage sensor 84.

In addition, the connector pin P10 of the power supply connector 12a, for example, is used in supplying an IPG signal output from the ECU 61 of the control apparatus 34 to the inverter control apparatus 82, in other words, a signal with a predetermined control voltage (12V) according to a control voltage supplied from the ECU 61 to the inverter control apparatus 82.

Furthermore, in the VCC signal, a predetermined control voltage is applied from the ECU 61 to the inverter control apparatus 82 using a VCC signal voltage line LH that is connected to the connecter pin P8 which is in a connection state by the power supply inlet 11a and the power supply connector 12a being fitted together.

The predetermined control voltage (5V) of the VCC signal, for example, in the control apparatus 34 of the fuel cell vehicle 11, can be obtained by dividing the predetermined voltage (12V) depending on the power supplied from the 12V battery 29 for driving the control apparatus 34, into a voltage corresponding to a reference voltage of an A/D converter (not illustrated) provided in the inverter control apparatus 82.

In addition, in the VINV signal, a voltage according to the power supplying state from the fuel cell vehicle 11 to the inverter apparatus 12 is applied from the inverter control apparatus 82 to the ECU 61 using a VINV signal voltage line LL that is connected to the connecter pin P9 which is in a connection state by the power supply inlet 11a and the power supply connector 12a being fitted together.

Furthermore, the VINV signal voltage line LL, for example, in the control apparatus 34 of the fuel cell vehicle 11, is connected to the VCC signal voltage line LH by a predetermined pull-up resistor RL.

Figure 2:
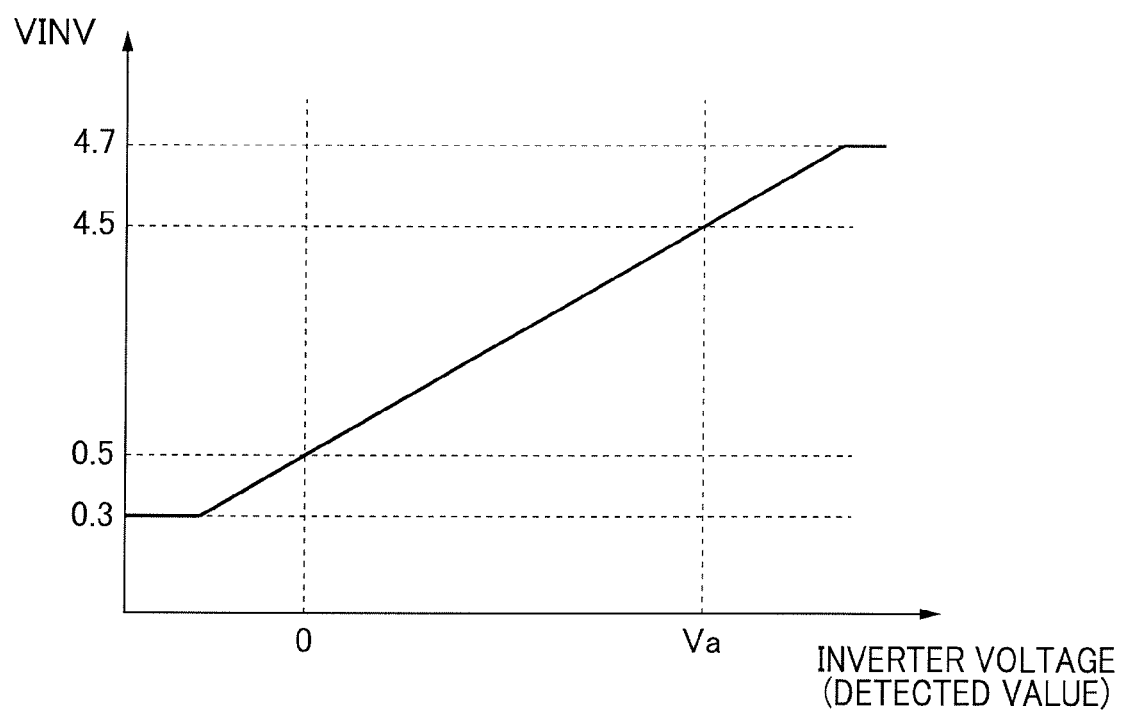
FIG. 2 is a graph illustrating a corresponding relationship between an inverter voltage (a detected value) VI which is detected by an inverter voltage sensor and a voltage of a VINV signal which is obtained in an ECU of the power supply system in the aspect of the embodiment of the invention.

In addition, the voltage of the VINV signal, for example, as illustrated in FIG. 2, in the control apparatus 34 of the fuel cell vehicle 11, can be obtained by dividing the predetermined control voltage (5V) of the VCC signal into a voltage according to the power supplying state from the fuel cell vehicle 11 to the inverter apparatus 12, for example, the inverter voltage (detected value) VI.

For example, in the state where the power supply inlet 11a and the power supply connector 12a are normally fitted together, in a case where the inverter voltage (detected value) VI is in a normal voltage range of zero to maximum voltage Va, the voltage of the VINV signal obtained in the ECU 61 is in the voltage range of 0.5 (V) to 4.5 (V).

In addition, for example, as shown in Table 1 below, in a case where high voltage lines of the positive electrode and a negative electrode (HV+, HV−) between the power supply inlet 11a and the power connecter 12a are not connected to each other (unfitted), or in a case where a disconnection occurs in the VINV signal voltage line LL in the inverter apparatus 12, the inverter voltage sensor 84 or the like, the voltage of the VINV signal obtained in the ECU 61 becomes equal to the predetermined control voltage (5V) of the VCC signal.

In addition, for example, in a case where there occurs a short circuit between high voltage lines of the positive electrode and a negative electrode (HV+, HV−) between the power supply inlet 11*a* and the power connecter 12*a* or in a case when there occurs a short circuit in the inverter voltage sensor 84 or the like in the inverter apparatus 12, the voltage of the VINV signal obtained in the ECU 61 becomes zero.

TABLE 1

|  | FITTED | | UNFITTED | |
|---|---|---|---|---|
|  | CONNECT [V] | VINV [V] | CONNET [V] | VINV [V] |
| CONNECT disconnected | 5 | 0.5 to 4.5 | 5 | 5 |
| CONNECT shorted | 0 | 0.5 to 4.5 | 0 | 5 |
| VINV disconnected | 1 to 4 | 5 | 5 | 5 |
| VINV shorted | 1 to 4 | 0 | 5 | 0 |
| short circuit | 0 | 0 | 0 | 0 |
| normal | 1 to 4 | 0.5 to 4.5 | 5 | 5 |

In addition, in the CONNECT signal, a voltage corresponding to the connection state of the CONNECT signal voltage line LA is applied from the inverter control apparatus 82 to the ECU 61, using a CONNECT signal voltage line LA that is connected to the connecter pin P7 which is in a connection state by the power supply inlet 11*a* and the power supply connecter 12*a* be fitted together.

In addition, the CONNECT signal voltage line LA, for example, in the control apparatus 34 of the fuel cell vehicle 11, is connected to the VCC signal voltage line LH by a predetermined pull-up resistor RA.

Then, for example, as shown in TABLE 1, in the control apparatus 34 of the fuel cell vehicle 11, the voltage of the CONNECT signal can be obtained by dividing the predetermined control voltage (5V) of the CONNECT signal into a voltage corresponding to the connection state of the CONNECT signal voltage line LA.

For example, in a case where the power supply inlet 11*a* and the power supply connecter 12*a* are normally fitted together, the voltage of the CONNECT signal obtained in the ECU 61 is in the voltage range of 1 to 4 V.

In addition, for example, in a case where CONNECT signal voltage lines LA of the positive electrode and the negative electrode between the power supply inlet 11*a* and the power connecter 12*a* are not connected to each other (unfitted), or in a case where a disconnection occurs in the CONNECT signal voltage line LA in the inverter apparatus 12, the voltage of the CONNECT signal obtained in the ECU 61 becomes equal to the predetermined control voltage (5V) of the VCC signal.

In addition, for example, in a case where there occurs a short circuit in the CONNECT signal voltage line LA, the voltage of the CONNECT signal obtained in the ECU 61 becomes zero.

In other words, for example, as shown in TABLE 1, in a case where there occurs a short circuit in the VINV signal and CONNECT signal (short circuit), each voltage of the VINV signal and the CONNECT signal obtained in the ECU 61 becomes zero.

The power supply system 10 according to the present embodiment includes the above configuration, and an operation of the power supply system 10, particularly an operation of the control apparatus 34 will be described.

The ECU 61 of the control apparatus 34, for example, further alleviates the fluctuations in the power generation amount of the fuel cell stack 21 with respect to the power required by the inverter apparatus 12, when the power supply circuit configured by each of the contactor 51, 53 and 54 and the power supply inlet 11*a* supplies the power to the inverter apparatus 12 compared with when the vehicle is driving.

In addition, for example, when the power supply circuit supplies power to the inverter apparatus 12, the ECU 61 stops the power generation of the fuel cell stack 21 in a case where the remaining capacity (SOC) in the battery 22 is greater than or equal to predetermined remaining capacity, and inhibits the fuel cell stack 21 from stopping the power generation in a case where the power supply amount which the power supply circuit supplies to the inverter apparatus 12 is greater than or equal to predetermined power supply amount.

Figures 3, 4:
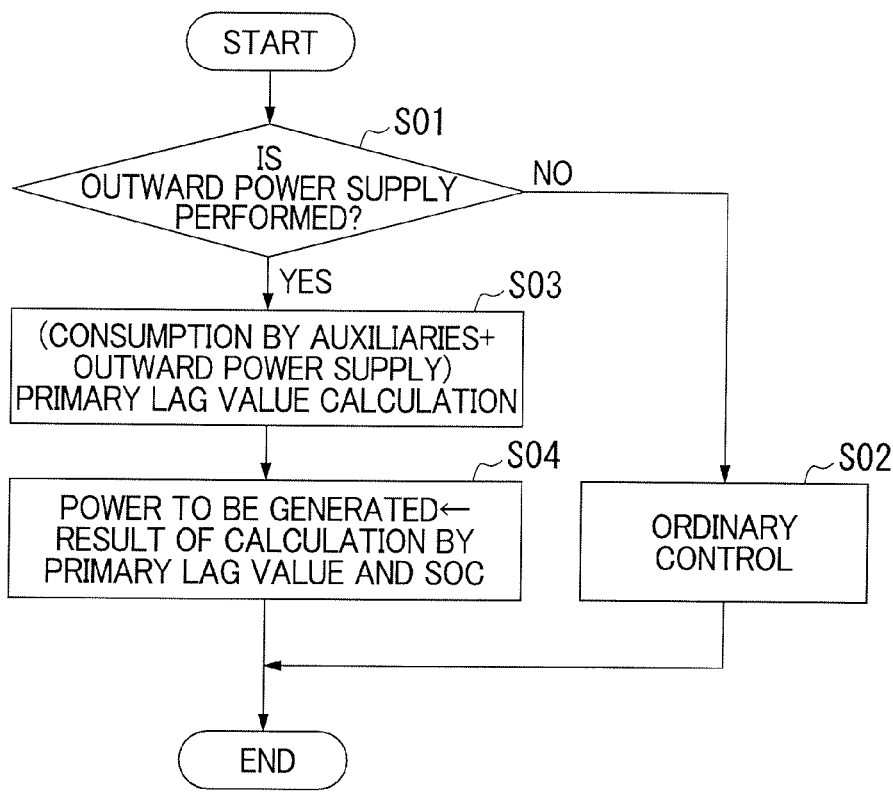
FIG. 3 is a flow chart illustrating an operation of a control unit of the power supply system according to the embodiment of the invention.
FIG. 4 is a predetermined map diagram illustrating a target amount of power generation (power to be generated) by a fuel cell stack in response to a primary time lag value of the power consumption by the system and a remaining capacity SOC of a battery.

Firstly, for example, in STEP S01 illustrated in FIG. 3, it is determined whether or not the power supply from the fuel cell vehicle 11 to the inverter apparatus 12 (outward power supply) is being performed.

In a case where the determination result is "NO", then the flow proceeds to STEP S02, and in STEP S02, an ordinary control is performed and the flow proceeds to "END".

On the contrary, in a case where the determination result is "YES", then the flow proceeds to STEP S03.

Then, in STEP S03, for example, a smoothing process such as a primary lag process or the like is performed and a primary lag value is calculated, with respect to an added value (power consumption by the system) of power consumption by various auxiliaries in the fuel cell vehicle 11 and the amount of supplied power (outward supplied power) to the inverter apparatus 12.

Then, in STEP S04, for example, referring to the predetermined map or the like stored in advance, as illustrated in FIG. 4, the target amount of power generation (power to be generated) by the fuel cell stack 21 is calculated in response to a primary lag value of the power consumption by the system and the remaining capacity SOC of the battery 22. Then, the actual amount of power generation by the fuel cell stack 21 is controlled so as to be equal to the target amount of power generation, and the flow proceeds to "END".

In addition, for example, in FIG. 4, charging or discharging is not performed with respect to the predetermined target SOC, and as the remaining capacity SOC is decreased to be lower than the target SOC, the target amount of the power generation by the fuel cell stack 21 is changed to have an increasing tendency, and the battery 22 is in a charging state. On the contrary, as the remaining capacity SOC is increased to be higher than the target SOC, the target amount of the power generation by the fuel cell stack 21 is changed to have a decreasing tendency, and the battery 22 is in a discharging state.

Furthermore, as the primary lag value of the power consumption by the system is increased (or decreased), the target amount of the power generation of the fuel cell stack 21 is changed to have the increasing tendency (or decreasing tendency).

Figure 5:
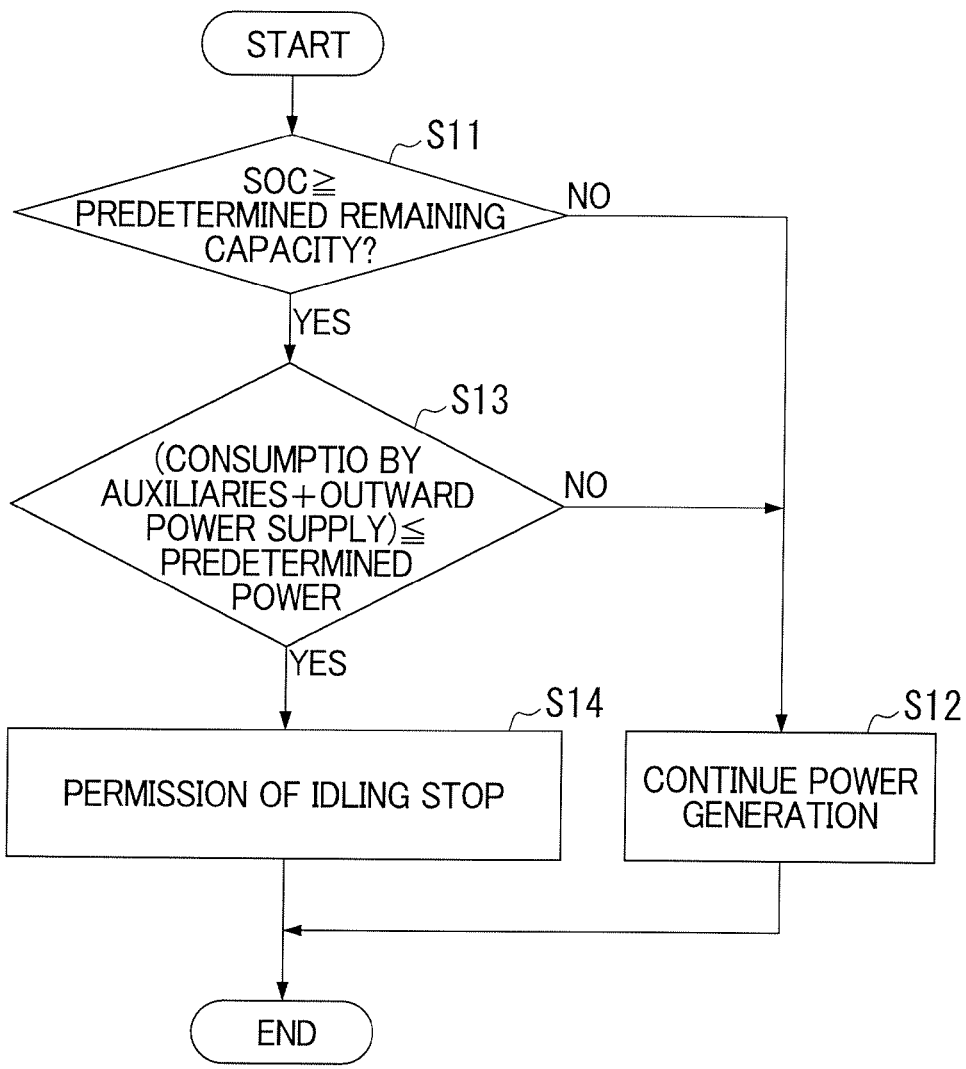
FIG. 5 is a flow chart illustrating an operation of the control unit of the power supply system according to the embodiment of the invention.

In addition, for example, in STEP S11 illustrated in FIG. 5, it is determined whether or not the remaining capacity SOC of the battery 22 is greater than or equal to the predetermined remaining capacity.

In a case where the determination result is "NO", then the flow proceeds to STEP S12, and in STEP S12, the power generation by the fuel cell stack 21 continues, and the flow proceeds to "END".

On the other hand, in a case where the determination result is "YES", the flow proceeds to STEP S13.

Then, in STEP S13, it is determined whether or not the added value (power consumption by the system) of power consumption by various auxiliaries in the fuel cell vehicle 11 and the amount of supplied power (outward supplied power) to the inverter apparatus 12 is less than or equal to the predetermined amount of power.

In a case where the determination result is "NO", the flow proceeds to STEP S12 as described above.

On the other hand, in a case where the determination result is "YES", the flow proceeds to STEP S14, and in STEP S14, stopping the operation of the fuel cell stack 21 is permitted (idling stop permission), and the flow proceeds to "END".

Figure 6:
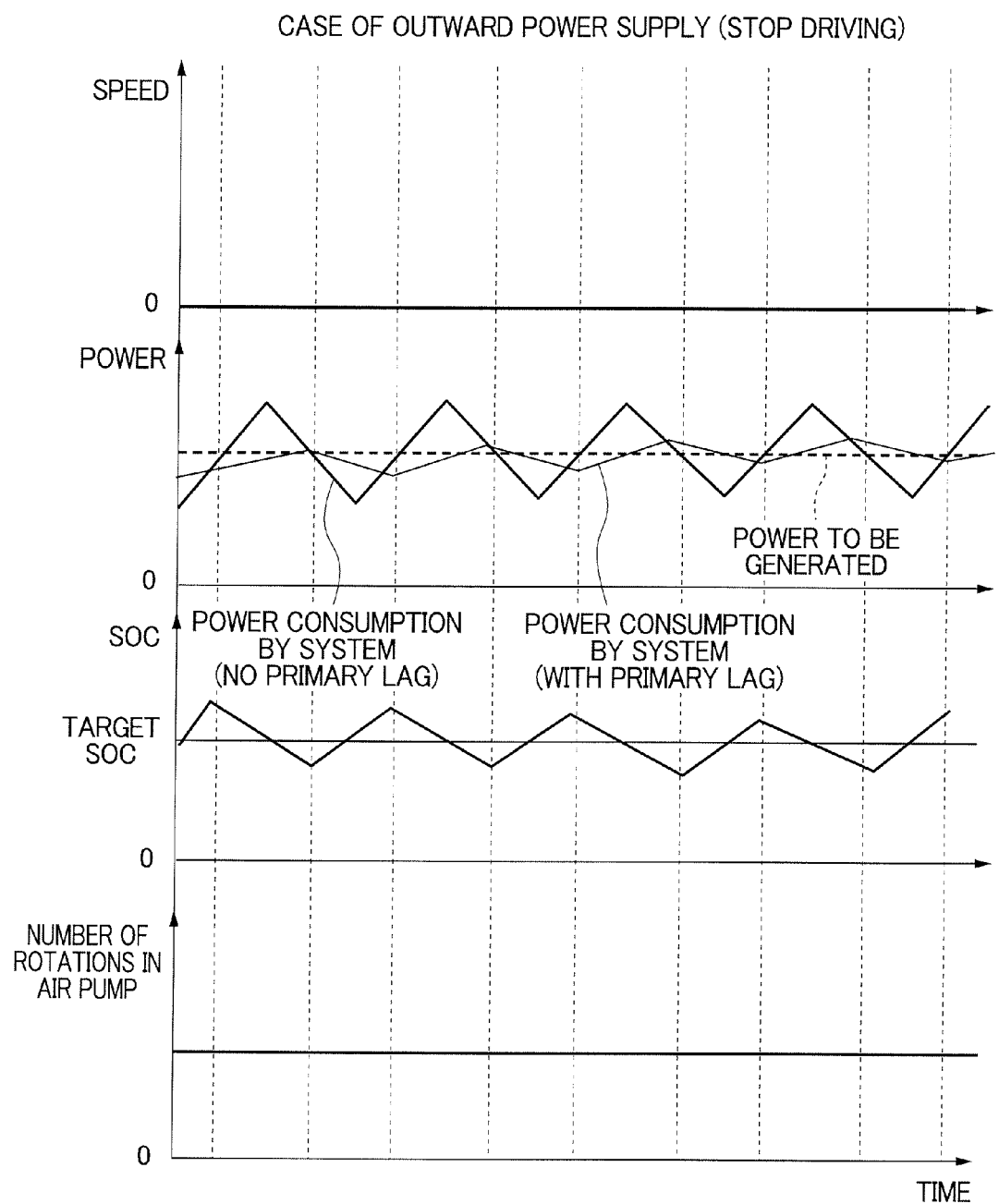
FIG. 6 is a diagram illustrating an example of fluctuations in the number of rotations in an air pump of the power supply system according to the embodiment of the invention.

For example, as illustrated in FIG. 6, during the outward power supply to perform the power supply to the inverter apparatus 12 in a state where the fuel cell vehicle 11 stops driving, a constant power generation of the fuel cell stack 21 can be maintained by performing the smoothing process such as the primary lag process and allowing a change of the remaining capacity SOC of the battery 22. As a result, the number of rotations in the air pump 26 is held constant.

Figure 7:
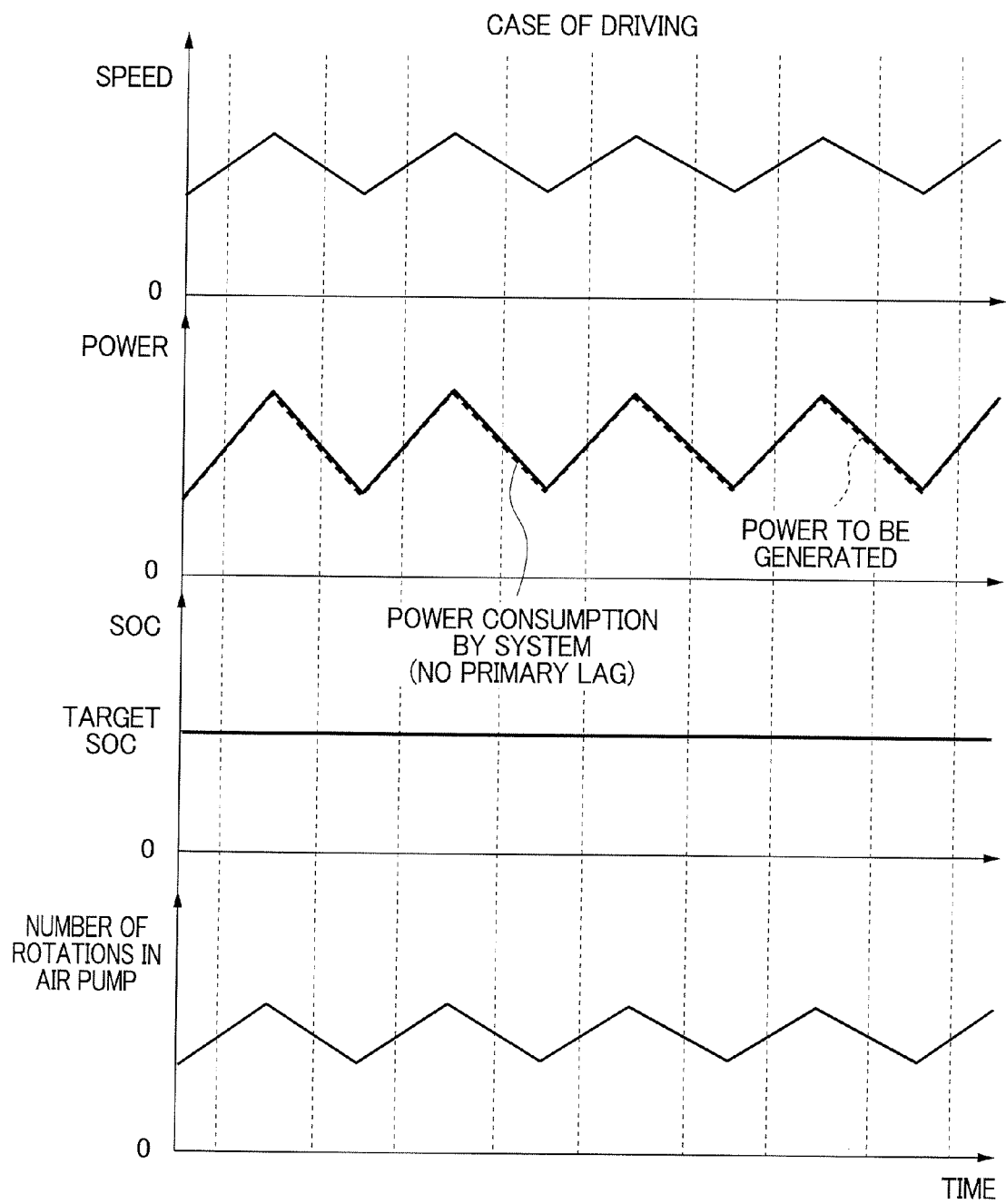
FIG. 7 is a diagram illustrating another example of fluctuations in the number of rotations in the air pump of the power supply system according to the embodiment of the invention.

On the other hand, for example, as illustrated in FIG. 7, in a case where the fuel cell vehicle 11 is in a driving state, the number of rotations in the air pump 26 is caused to fluctuate in response to the speed of the fuel cell vehicle 11 by maintaining the remaining capacity SOC of the battery 22 at a constant level and changing the power generation of the fuel cell stack 21 in line with the power consumption by the system.

Figure 8:
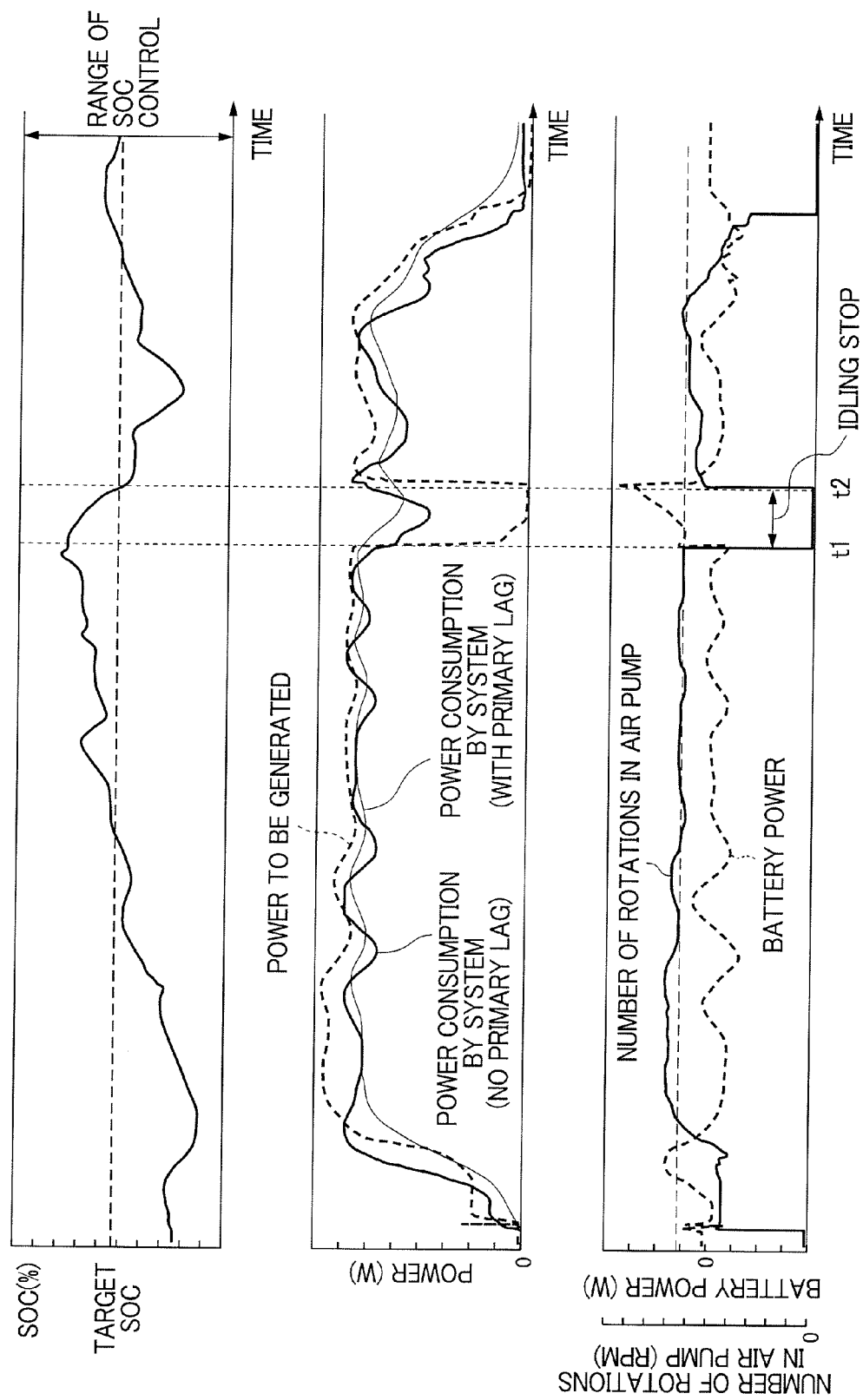
FIG. 8 is a diagram illustrating another example of fluctuations in the number of rotations in the air pump of the power supply system according to the embodiment of the invention.

In addition, for example, as illustrated in FIG. 8, in a case where the remaining capacity SOC of the battery 22 is greater than or equal to the predetermined remaining capacity (for example, the target SOC) and the power consumption by the system is less than or equal to the predetermined amount of power, as illustrated in time duration from t1 to t2, the power generation of the fuel cell stack 21 is stopped and the power output from the battery 22 (battery power) is increased.

As described above, according to the outward power supply control apparatus for the fuel cell vehicle in the embodiment, in a case where the power is supplied to the inverter apparatus 12 by the power supply circuit configured by each of the contactors 51, 53 and 54 or the power supply inlet 11a which are installed in the fuel cell vehicle 11, it is possible to suppress the frequent fluctuations in the number of rotations in the air pump 26 in response to the power required by the inverter apparatus 12.

As a result, the number of rotations in the air pump 26, for example, fluctuates so as to comply with the required driving force for the fuel cell vehicle 11 based on a driver's accelerator pedaling or the like, and hence it is possible to prevent the noise generated in accordance with the number of rotations in the air pump 26 when the fuel cell vehicle 11 is driving, from distracting a driver.

It is also possible to decrease losses due to the charging and discharging of the battery 22 by suppressing the changes of the remaining capacity SOC of the battery 22 when the fuel cell vehicle 11 is driving.

Furthermore, it is possible to decrease the fuel consumption of the fuel cell stack 21 by the idling stop process. In addition to this, even though the remaining capacity SOC of the battery 22 is greater than or equal to the predetermined capacity, in a case where the power supplied to the inverter apparatus 12 is greater than or equal to a predetermined amount of power, it is possible to prevent the air pump 26 from frequently repeating the stopping and driving by inhibiting the idling stop process from stopping the power generation (the idling continuing process).

What is claimed is:

1. An outward power supply control apparatus for a fuel cell vehicle comprising:
   a fuel cell stack;
   an air pump configured to supply air to the fuel cell stack;
   an air pump motor configured to drive the air pump;
   an electrical storage apparatus;
   a drive motor driven by power from the fuel cell stack and the electrical storage apparatus;
   a power supply circuit configured to supply the power from the fuel cell stack and the electrical storage apparatus to an equipment outside the vehicle; and
   a control device comprising a power generation fluctuation limiting device configured to further alleviate a fluctuation in a power generation amount of the fuel cell stack with respect to the power required by the equipment by setting a target power generation amount of the fuel cell stack based on a primary lag value calculated by a smoothing process to the power required by the equipment, when the power supply circuit supplies the power to the equipment compared with when the vehicle is driving.

2. The outward power supply control apparatus for a fuel cell vehicle according to claim 1, wherein the control device is configured to perform:
   an idling stop process that is configured to stop the power generation of the fuel cell stack when the power supply circuit supplies the power to the equipment, in a case where a remaining capacity in the electrical storage apparatus is greater than or equal to a predetermined remaining capacity and the power supplied to the equipment by the power supply circuit is less than or equal to a predetermined power supply amount; and
   an idling continuing process that is configured to continue the power generation in a case where a remaining capacity in the electrical storage apparatus is less than the predetermined remaining capacity or the power supplied to the equipment by the power supply circuit is greater than the predetermined power supply amount.

* * * * *